United States Patent
Ahlin et al.

[11] Patent Number: 5,435,122
[45] Date of Patent: Jul. 25, 1995

[54] TEMPERATURE CONTROL METHOD AND APPARATUS FOR THE AIR SUPPLY IN PFBC PLANTS

[75] Inventors: Roger Ahlin, Norrköping; Ben Kyrklund; Saideh Novin, both of Finspong, all of Sweden

[73] Assignee: ABB Carbon AB, Finspong, Sweden

[21] Appl. No.: 204,348
[22] PCT Filed: Sep. 8, 1992
[86] PCT No.: PCT/SE92/00615
  § 371 Date: Mar. 11, 1994
  § 102(e) Date: Mar. 11, 1994
[87] PCT Pub. No.: WO93/06350
  PCT Pub. Date: Apr. 1, 1993

[30] Foreign Application Priority Data
  Sep. 13, 1991 [SE] Sweden ............... 9102654

[51] Int. Cl.[6] .......................... F02C 3/26; F02C 7/143
[52] U.S. Cl. .......................... 60/39.02; 60/39.12; 60/728
[58] Field of Search .................. 60/39.02, 39.464, 728; 415/179

[56] References Cited

U.S. PATENT DOCUMENTS 4,362,462 12/1982 Blotenberg .................. 415/179
4,530,207 7/1985 Brannstrom ................. 60/39.464
4,584,949 4/1986 Brannstrom ................. 60/39.464
4,893,466 1/1990 Egnell et al. .

FOREIGN PATENT DOCUMENTS 2112038 1/1975 Germany .

*Primary Examiner*—Louis J. Casaregola
*Attorney, Agent, or Firm*—Pollock, Vande Sande & Priddy

[57] ABSTRACT

A method for temperature control of an air supply in PFBC plants which comprise a low-pressure unit including a low-pressure compressor and a low-pressure turbine, a high-pressure unit including a high-pressure compressor and a high-pressure turbine, wherein air is sucked into the low-pressure compressor whereupon the air is passed via an intermediate cooler, which is traversed by water, into the high-pressure compressor and then into a boiler of the plant. The method includes measuring in a temperature control system a temperature of the air both upstream and downstream of the high-pressure compressor, comparing the two measured temperature values and corresponding set values for the respective upstream and downstream temperature, and activating, based only on one of the comparisons, a shunt valve of an intermediate cooler. The control signal of the shunt valve consists of the output signal from the temperature control system.

7 Claims, 3 Drawing Sheets

5,435,122

TEMPERATURE CONTROL METHOD AND APPARATUS FOR THE AIR SUPPLY IN PFBC PLANTS

BACKGROUND OF THE INVENTION

To ensure satisfactory function of the turbine units in a PFBC plant, it is required that the temperature of the air when it passes through compressors is maintained within certain given limits. If this is not done, compressors may, for example, reach a working range where surge occurs.

PFBC plants have been described in a number of patent specifications, technical papers etc. In this description, therefore, only the parts of such a plant which are needed to describe the air system will be briefly described. The Swedish patent application SE 9102651-8 entitled "Air flow control system in PFBC plants", filed concurrently herewith, describes in detail, in addition to the PFBC plant as such, how an air system is built up. It also describes the important limitations that such a system entails and how these are overcome with the aid of controls overriding each other.

SUMMARY OF THE INVENTION

The present invention comprises methods and devices for controlling and limiting the temperature of the air on the output of the high-pressure compressor, that is, before the air is passed into the pressure vessel and the combustor of the PFBC plant, and also for limiting the temperature of the air on the input of the high-pressure compressor both during stationary operation and during load change.

A PFBC plant which includes the air temperature control according to the present invention comprises a twin spool gas turbine unit. To the low-pressure shaft there are connected a low-pressure compressor and a low-pressure turbine, and to the high-pressure shaft there are connected a high-pressure compressor and a high-pressure turbine. Air is sucked via the inlet duct into the low-pressure compressor and is passed on via an intermediate cooler to the high-pressure compressor. The air which thereby passes through the high-pressure compressor is pressed into the boiler of the PFBC plant. The return flow from there first passes through the high-pressure turbine and then through the low-pressure turbine and is then released into the free environment.

In order for an air supply system to function satisfactorily, certain limitations must be introduced with regard to the temperature of the air, in addition to the limiting controls described in the above-mentioned "Air flow control system in PFBC plants", and the purpose of the invention, as mentioned above, is to maintain the temperature both downstream and upstream of the high-pressure compressor within permissible limits.

In the Swedish patent application dealing with air flow control, it is stated that in the air passage between the low-pressure compressor and the high-pressure compressor there is provided an intermediate cooler with the implicit but obvious task of cooling the air flow. Swedish patent SE 8602003-9, "A method for operation of a turbine unit", describes both an external intermediate cooler and an internal intermediate cooler arranged in the connection between the low-pressure compressor and the high-pressure compressor. These intermediate coolers are arranged for heat exchange between the air in the compressor circuit and the condensate from the condenser (or similar medium). This patent specification further states that "By the intermediate cooling the temperature of the air to the high-pressure compressor is reduced while at the same time the condensate to the feedwater tank is heated in the internal intermediate cooler". However, no temperature control is mentioned in this connection.

The maximum permissible temperature at the output of the high-pressure compressor is determined by the maximum permissible temperature of the interdependent systems during stationary operation. To be able to limit this temperature, the air out from the high-pressure compressor is temperature-controlled by means of the intermediate cooler. The intermediate cooler may, for example, be of cross-flow type with cooling water on the tube side. A constant water flow is maintained by a circulation pump and the temperature of the water in the intermediate cooler is controlled by a shunt valve. The valve mixes hot water from the outlet of the intermediate cooler with colder cooling water, for example district heating water. If the cooling effect of the intermediate cooler should be reduced, the output power of the gas turbine has to be limited to protect against compressor surge. The circulation pump maintains the cooling water flow through the intermediate cooler to ensure a uniform cooling of the air through the compressor. Unintentional shutdown of the circulation pump triggers an alarm signal.

During load increase, the pressure ratio across the high-pressure compressor decreases and a corresponding increase of the low-pressure compressor pressure ratio takes place. This means that the temperature of the air at the input of the high-pressure compressor increases and reaches values which may be far above the corresponding steady-state value for that particular load. Because of the high air temperature at the input of the high-pressure compressor, the high-pressure compressor suction of the air downstream of the low-pressure compressor deteriorates. Thereby, the low-pressure compressor may be forced towards the surge limit, which may lead to GT trip. To prevent the temperature of the air at the input of the high-pressure compressor from rising above a certain value and thus prevent the occurrence of the above phenomenon, a temperature control is arranged, again with the intermediate cooler as control executing object.

Since the intermediate cooler can only function as central executing object for one of the above-mentioned controls at a time, the invention comprises the use of a maximum selector which selects the control which is in greatest need of cooling.

Introducing temperature control of the air in the manner described entails considerable advantages for the operation of PFBC plants. By limiting and maintaining the temperature on the inlet side of the high-pressure compressor at a controlled level, a safer and better margin with respect to the surge limit of the low-pressure compressor is obtained. This means that the risk of GT trips is reduced. In addition, the charging capacity will be improved since the power required by the low-pressure compressor during the charging phase is reduced when the pressure after the low-pressure compressor drops. There is also always a risk that the temperature of the gas upstream of the low-pressure turbine may become too high at high outdoor temperatures if no limitation of the temperature is provided. The temperature control according to the present invention also reduces the gas temperature upstream of the low-pressure turbine.

BRIEF DESCRIPTION OF THE DRAWINGS

The present invention will now be described in more detail in conjunction with the accompanying drawings wherein.

DETAILED DESCRIPTION OF THE PREFERRED EMBODIMENT(S)

Figure 1:
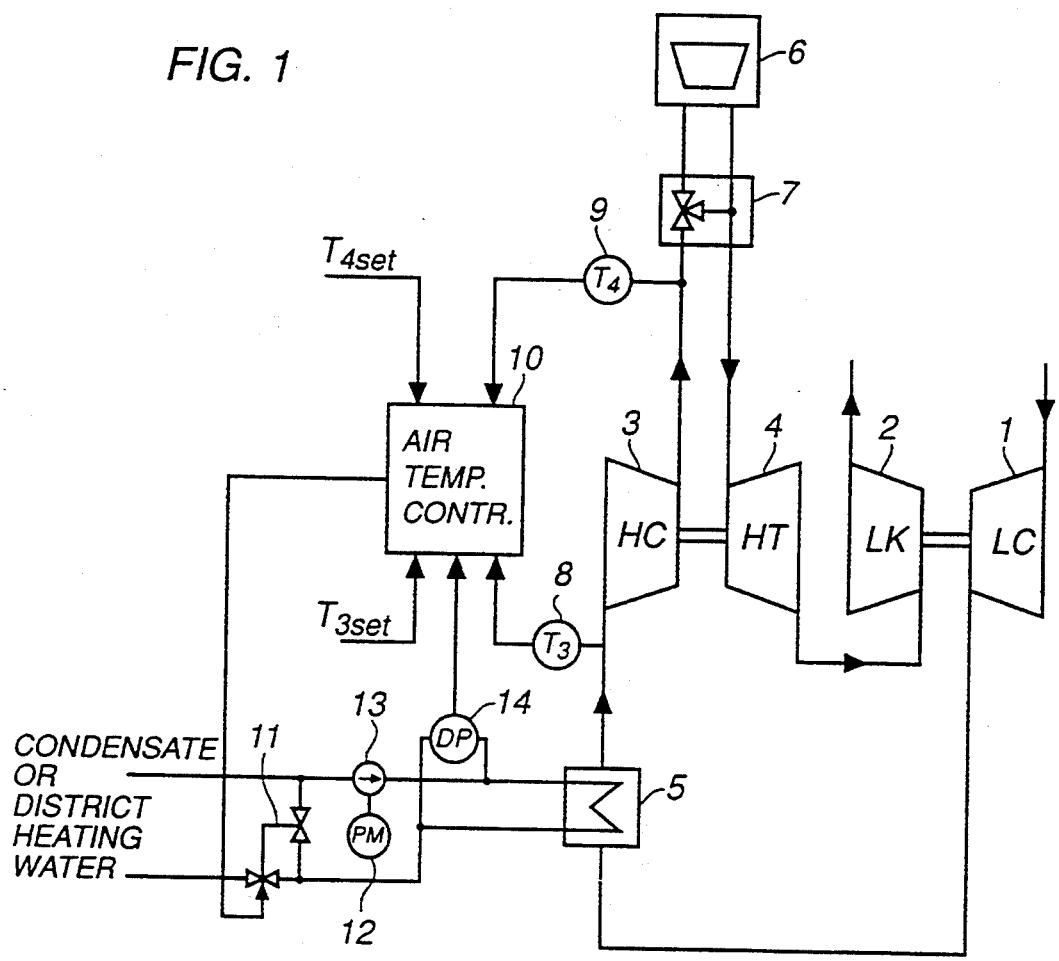
FIG. 1 shows the air/gas passage through the gas turbine unit and the basic concept of the control systems.

FIG. 1 shows both the low-pressure unit including a low-pressure compressor 1 into which air sucked and a low-pressure turbine 2, and the high-pressure unit with the high-pressure compressor 3 and the high-pressure turbine 4. The sucked-in air is passed from the low-pressure compressor 1 via an intermediate cooler 5 to the high-pressure compressor 3 and from there it is passed on to the boiler 6 of the PFBC plant. The air to the boiler 6 and the gas flow from the boiler 6 pass through the intercept valves 7. The return flow is then passed to the high-pressure turbine 4 and is then passed on via the low-pressure turbine 2 out into the free environment.

FIG. 1 also shows the measuring means 8 for measuring the temperature $T_3$ ahead of the high-pressure compressor and measuring means 9 for measuring the temperature $T_4$ after the high-pressure compressor. Both of these measured values are supplied to the air temperature controller 10 together with the set values for the respective controls, that is, $T_{3set}$ and $T_{4set}$. The air temperature control actuates the shunt valve 11 which in closed position cuts off all cold water supply to the intermediate cooler. The temperature of the water in the intermediate cooler will thus be raised. The task of the temperature control is to ensure to it that the water heated in the intermediate cooler is mixed with the colder cooling water from the cooling water network so as to obtain sufficient cooling. This can be done by opening the shunt valve, whereby cold cooling water starts flowing into the intermediate cooler and in this way the cooling effect of the intermediate cooler will increase. In fully open position the water of the intermediate cooler will be returned to the cooling medium network, that is, the bypass section of the shunt valve is closed.

The water circulation in the intermediate cooler is performed with the aid of a circulation pump 13 driven by a pump motor PM 12. When the shunt valve is closed, the same water will thus circulate in the circuit which comprises the intermediate cooler, the bypass section of the shunt valve, and the circulation pump.

To supervise the water flow through the intermediate cooler, the pressure drop across the water side of the intermediate cooler is measured, for example with the difference pressure gauge 14, the measured value DP of which is also supplied to the temperature controller. If the measured value is lower than a certain value, special measures are taken in the temperature control system, which will be described in greater detail under the description of the control system itself.

Figure 2:
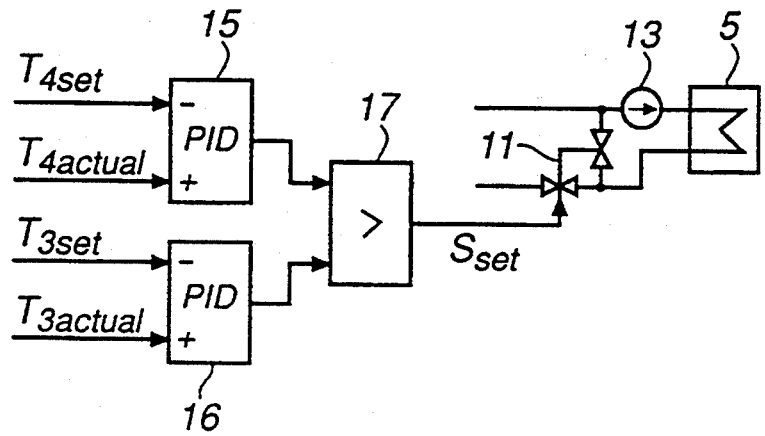
FIGS. 2 and 3 show two alternative embodiments of the control loops.
Figure 3:
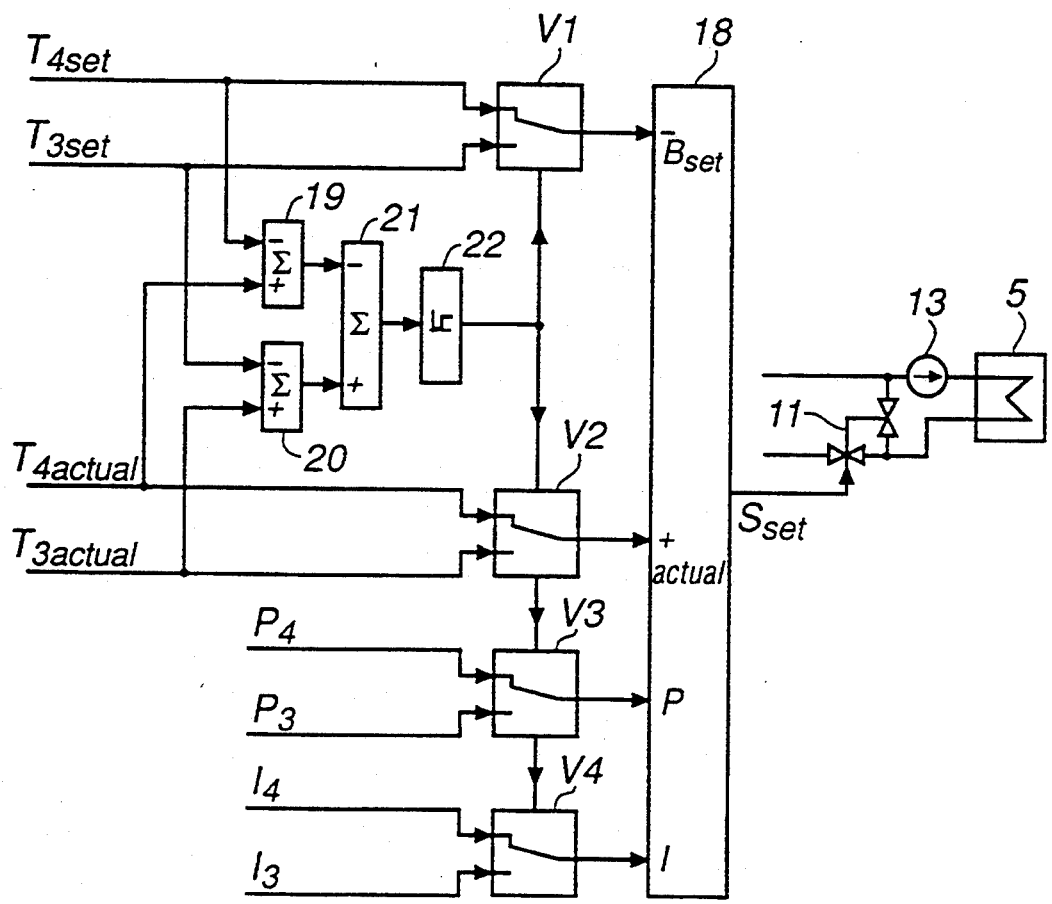

The control principle for temperature control of the air supply in a PFBC plant according to the invention will be clear from FIGS. 2 and 3, which show two different embodiments. In these diagrams all the limiting and interlocking functions have been omitted. The composition of the components included in the control systems, such as controllers, selector devices, etc., may be varied in numerous ways consisting of analog, digital or hybrid analog/digital components in more or less integrated form. This is, of course, also true of the devices and components which are added in connection with the composition of limiting and interlocking functions according to FIG. 4, which shows these functions integrated with the control principle according to FIG. 2. The position control of the shunt valve may also be designed in several different ways with continuous control, three-position control or the like, and the operation may be electrical or pneumatic.

In FIG. 2 the set and actual values for the temperature downstream of the high-pressure compressor, that is, $T_{4set}$ and $T_{4actual}$, are compared in a first controller 15, and in the same way the set and actual values for the temperature upstream of the high-pressure compressor, that is, $T_{3set}$ and $T_{3actual}$, are compared in a second controller 16. The outputs of the controllers are supplied to a maximum selector 17, the output signal of which consists of the greater of the control signals from the two controllers. This signal constitutes the set value $S_{set}$ for the subsequent position control of the shunt valve.

FIG. 3 shows another embodiment of the same temperature control. In this embodiment the selection between the two temperatures is done before the temperature control 18 is made. The selection is performed in such a way that $T_{4set}$ and $T_{4actual}$ are compared in a first summator 19, $T_{3set}$ and $T_{3actual}$ are compared in a second summator 20, whereafter the output signals of the two summators are compared in a third summator 21. The polarity on the output of the latter summator will then determine which of the controls is to be active. The polarity is converted in a limiter 22 to either a "0"- or a "1"-signal, which activates a number of selectors which connect the control loop which is most in need of control into the controller. In the state shown in FIG. 3, the output signal from the limiter is equal to zero. The selectors V1 and V2 then connect $T_{4set}$ and $T_{4actual}$ to the controller while at the same time the selectors V3 and V4 connect into the controller the proportional part $P_4$ and integral part $I_4$ of that control. In a corresponding way, the temperature control for the temperature before the high-pressure compressor is switched on when the output on the limiter 22 becomes "1". The subsequent position control of the shunt valve is the same as is clear from FIG. 2.

Figure 4:
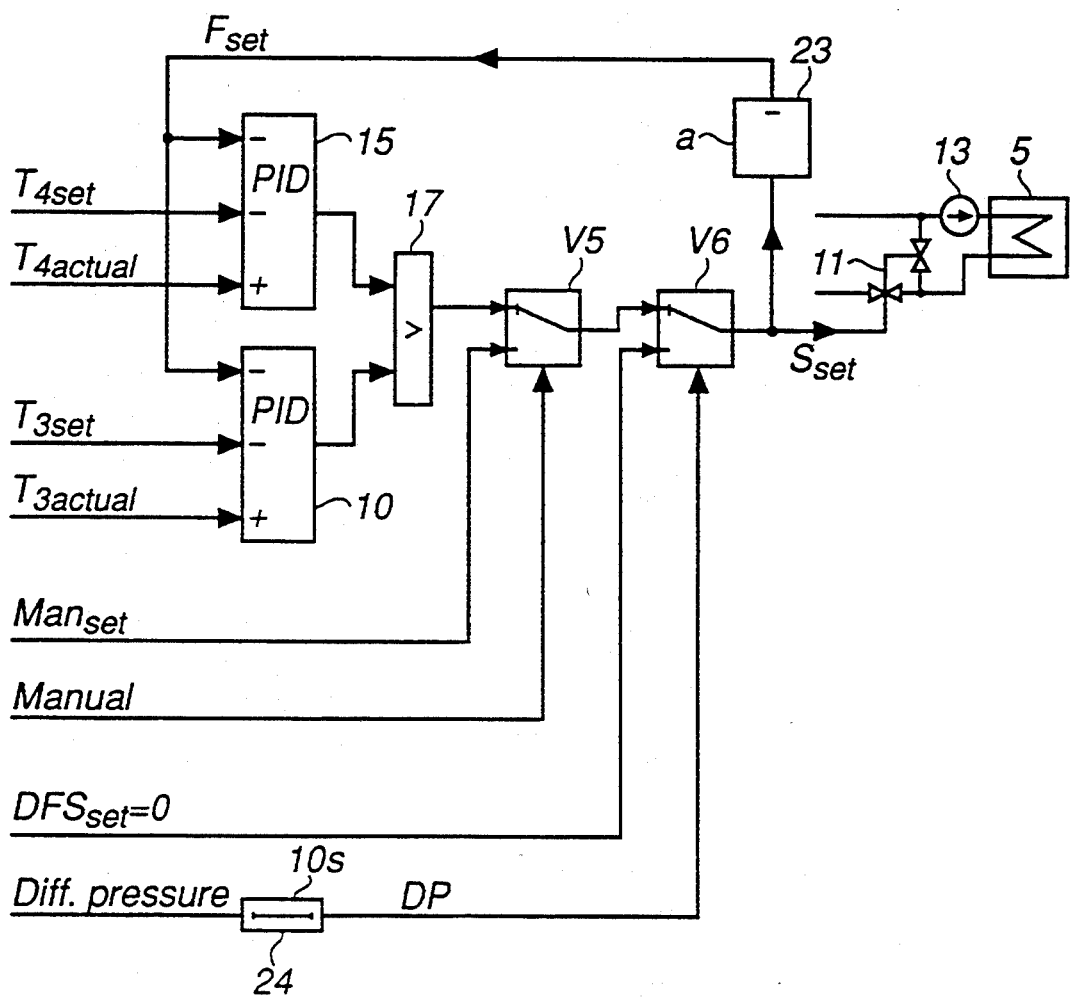
FIG. 4 shows an embodiment of the integration of the control loops with the other operating and protective loops.

FIG. 4 shows the functional relationship between the control loops and the limiting and interlocking loops when the embodiment for the control system is the one shown in FIG. 2. The same functional relationship, of course, exists also when the control system has an embodiment according to FIG. 3.

It is important to prevent large disturbance bumps during the transition between control at $T_4$ and $T_3$ and vice versa. The set value $S_{set}$ for the position control of the shunt valve, which in normal operation consists of the output of the maximum selector, is therefore allowed to be reduced via a reducing device 23 by a certain percentage a and the reduced value is allowed to form a follow-up set value $F_{set}$ which is supplied to the two controllers. These are connected such that that controller which is not active receives an output signal which is lower, by the above percentage, than the corresponding value of the controller which is active. This means that the signal on the output of the controller 16 in the operating case shown in FIG. 4 will have a value somewhat lower than the signal on the output of the controller 15. If, on the other hand, the difference between $T_{3set}$ and $T_{3actual}$ becomes so great that the temperature control is to be taken over by the $T_3$ control, the controller 15 for the $T_4$ control will be controlled towards a correspondingly lower value.

It is, of course, desirable to be able to control the position of the shunt valve manually, which can be made by activating, by an activating signal "Manual", a selector V5 which connects a desired set value $Man_{set}$. The activation can be made via an operator or via protection signals. This value now constitutes the set value of the shunt control instead of the control signal from any of the controllers.

As mentioned above, there must be a certain minimum flow through the intermediate cooler. If the flow is below a certain limit, information about this is received via the difference pressure gauge 14 according to FIG. 1, which measures the pressure drop across the water side of the intermediate cooler. If a pressure drop is lower than the minimum limit DP and the period during which it is lower is 10 seconds or more, which is monitored by the time lag element 24, the selector V6 is activated, which overrides both the control signal from the controllers and the manual operation. A fixed set value $DPS_{set}=0$ is then connected into the control of the shunt valve.

We claim:

1. A method for temperature control of an air supply in PFBC plants which comprise a low-pressure unit including a low-pressure compressor and a low-pressure turbine, a high-pressure unit including a high-pressure compressor and a high-pressure turbine, wherein air is sucked into the low-pressure compressor whereupon the air is passed via an intermediate cooler, which is traversed by water, into the high-pressure compressor and then into a boiler of the plant, said method comprising the steps of:

measuring in a temperature control system a temperature of the air both upstream and downstream of the high-pressure compressor;

comparing the two measured temperature values and corresponding set values for the respective upstream and downstream temperature; and activating, based only on one of the comparisons, a shunt valve of an intermediate cooler, the control signal of which consists of the output signal from the temperature control system.

2. A method for temperature control according to claim 1, wherein the set and actual values are compared in individual controllers and wherein the outputs of the controllers are inputted to a maximum selector, the output signal of which corresponds to the signal from the temperature control system.

3. A method for temperature control according to claim 2, wherein with the aid of a reduced value of the output signal from the temperature control system, a follow-up set value is formed, the follow-up set value is transmitted to the controllers which are connected such that the output signal from that controller whose output is not active is reduced toward a signal corresponding to the output signal from a controller which is active.

4. A method for temperature control according to claim 2, wherein the set and actual values for a downstream controller are compared in a first summator and the set and actual values for an upstream controller are compared in a second summator, wherein the output signals of the two summators are supplied to a third summator, and wherein a controller which is to be activated is determined by a polarity of the output signal transmitted by the third summator, the output signal is fed from the third summator to a limiter and then to polarity controlled selectors, the set and actual values for the controller which is to be activated together with a proportional value and an integral value determined for the respective control are supplied to a common controller, an output signal of the common controller corresponds to the output signal from the temperature control system.

5. A method for temperature control according to claim 1, wherein the control signal from the temperature control system for control of the shunt valve is replaced by a set value for manual control of the shunt valve.

6. A method for temperature control according to claim 1, wherein the control signal from the temperature control system for control of the shunt valve is replaced by a set value for control of the shunt valve when a pressure drop across the water side of the intermediate cooler is below a certain minimum value.

7. A device for temperature control of an air supply in PFBC plants which comprise a low-pressure unit including a low-pressure compressor and a low-pressure turbine, a high-pressure unit including a high-pressure compressor and a high-pressure turbine and an intermediate cooler located in the air passage between the low-pressure and high-pressure compressors, said device comprising:

measuring means for measuring a temperature of air upstream and downstream of the high-pressure compressor; and controlling means for comparing the measured temperatures and corresponding set values for the upstream and downstream temperatures and for forming and supplying a control signal to the intermediate cooler, the control signal determining the cooling effect of the intermediate cooler via a shunt valve.

* * * * *